March 9, 1965
M. J. CAPARONE
3,172,601
COMBINATION DIAPHRAGM VALVE AND PRESSURE REGULATOR
CONTROL AND SYSTEM OF CONTROL
Filed Oct. 26, 1961
3 Sheets-Sheet 1
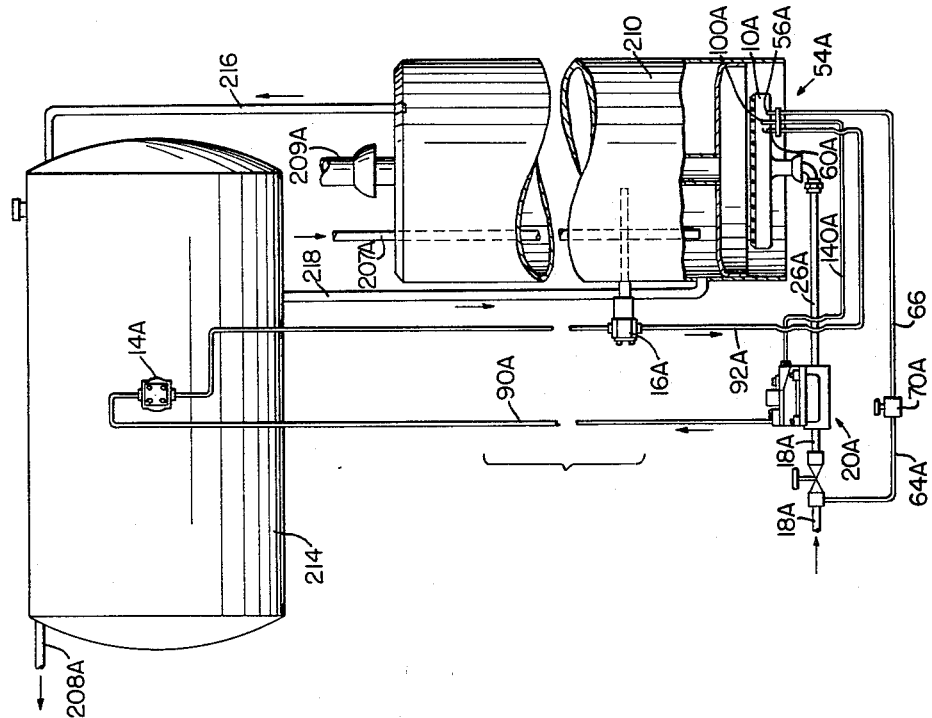
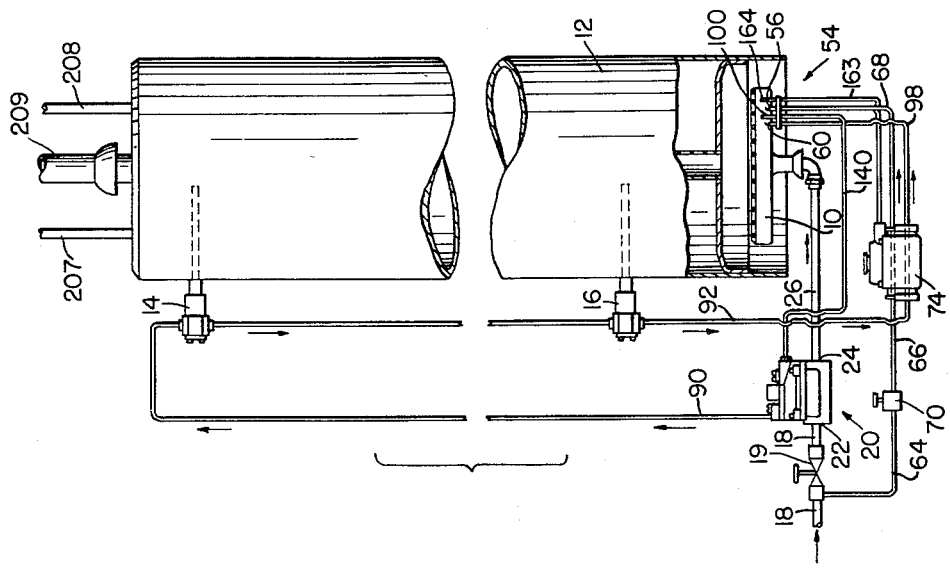
INVENTOR.
MICHAEL J. CAPARONE
BY
Robert R. Candon
ATTORNEY

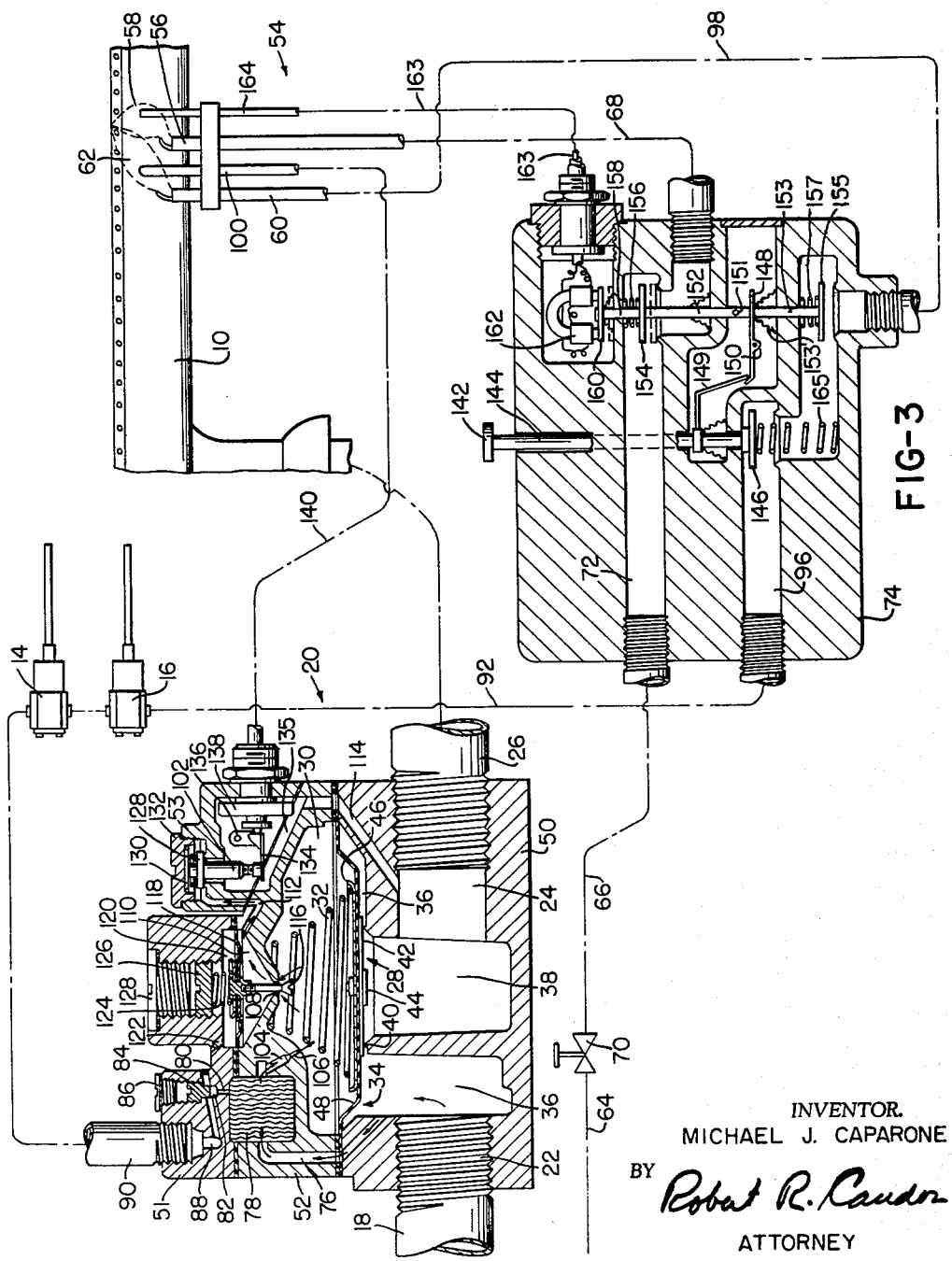

March 9, 1965

M. J. CAPARONE 3,172,601

COMBINATION DIAPHRAGM VALVE AND PRESSURE REGULATOR
CONTROL AND SYSTEM OF CONTROL

Filed Oct. 26, 1961

INVENTOR.
MICHAEL J. CAPARONE

BY Robert R. Cauden
ATTORNEY 3,172,601
COMBINATION DIAPHRAGM VALVE AND PRESSURE REGULATOR CONTROL AND SYSTEM OF CONTROL
Michael John Caparone, Arcadia, Calif., assignor to Robertshaw Controls Company, a corporation of Delaware
Filed Oct. 26, 1961, Ser. No. 147,952
7 Claims. (Cl. 236—21)

This invention relates to the control of gas flow from a gas supply to a burner, and a pilot means for igniting the burner.

The burner supplies heat to a space to be heated and the supply of gas to the burner and the igniting pilot means is regulated in response to the temperature in the space.

In addition, the supply of gas to the burner is regulated by a main valve construction which is a combined shutoff valve and a pressure regulating valve for the burner. This valve construction is responsive to the temperature of the space being heated to shut off the flow of gas to the burner, and the valve construction is also responsive to the pressure of the gas being fed to the burner and tends to maintain such pressure of the gas for the burner, within desired limits.

The main valve construction has a main diaphragm valve and is of such construction that its inlet may be connected to a gas supply line and its outlet may be connected to the burner. A small volume gas bleed line is provided in the main valve construction which flows from the inlet to the outlet and through flow restriction means in such a manner that the main diaphragm valve is automatically fully closed by gas pressure regulated on one side of the diaphragm valve by said bleed line when the space temperature is at a desired maximum and is partially opened in varying degrees in a manner to maintain the outlet gas pressure sufficiently constant to maintain the desired burner conditions.

A pilot means is provided to ignite the burner and to cause the opening and closing of said main diaphragm valve in response to temperature conditions in the space being heated.

The pilot means has a standby pilot section or condition to cause a pilot light to be constantly burning for ignition of the burner. The pilot means also has an intermittent pilot section or condition to cause said main diaphragm valve to open and close in response to temperature in said space.

The main valve construction may have within one casing passageways and an opening for connection to an intermittent pilot gas line which may pass through a thermostat arrangement in said heated space and which may be connected to said pilot means to produce said intermittent pilot condition in response to space temperatures.

The main valve construction may also have within one casing a bleed line valve and valve motor to modify the gas flow through the bleed line in response to intermittent pilot conditions to open and close the main diaphragm valve and may also have a small pressure responsive valve to modify the bleed line to regulate the extent of the opening of the main diaphragm valve for regulation of the burner gas pressure.

Accordingly, it is an object of this invention to provide control apparatus having one or more of the features herein disclosed.

Other objects of this invention are apparent from this description and the accompanying drawings, in which:

FIGURE 1 is a diagrammatic representation of a system embodying this invention.

FIGURE 2 is a diagrammatic representation of another system embodying this invention.

FIGURE 3 is a diagrammatic representation of components applicable to the systems of FIGURES 1 and 2, with the features of main valve construction shown schematically in a single plane.

Figure 6:
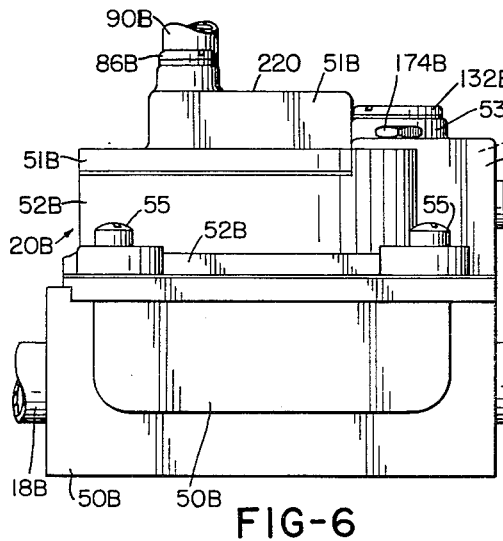
FIGURE 6 is a side view of a main valve construction, such as shown in FIGURE 3, but modified as shown in FIGURE 5.

Certain words indicating direction, relative position, etc., such as "vertical," "horizontal," "upper," "lower," etc., are used herein for the sake of brevity and clearness of description. However, it is to be understood that such words are used in connection with the drawings only, and that the actual apparatus, etc., which is in actual use, may have other directions, relative positions, etc., and still be within the purview of this invention.

Referring first to FIGURES 1, 3, 4 and 5, a main gas burner 10 heats a space, such as water heater 12. Gas flow controlling thermostatic valve means, such as one or more gas throttling valves 14 and 16, opens and closes in response respectively to temperature fall and rise in said space 12. A gas supply means or pipe 18 may be connected to the main gas supply system and may be provided with a main gas valve 19 which controls the flow of gas into the entire system, with the exception of standby pilot to be described.

A regulator construction, or unitary valve construction 20, may have its intake or inlet 22 connected to said gas supply means and its discharge or outlet 24 connected to said burner 10 by means of pipe 26.

The unitary valve construction 20 may have a main valve, such as diaphragm valve 28, controlling the main flow of gas from said gas supply means 18 to said burner 10.

The unitary valve construction 20 also has a pressure chamber 30 controlling the opening and closing of the main valve 28. The valve 28 opens when the gas pressure in pressure chamber 30 combined with the additional pressure means, such as the spring pressure of compression spring 32, produces less pressure on one side of the diaphragm 48 than the pressure produced on the other side of the diaphragm by the inlet pressure area 36 combined with the outlet pressure area 38. The areas 36 and 38 are separated from each other by the orbital or circular valve seat 40 when the valve 28 closes upon the seat 40. Conversely, the valve 28 closes when the combined pressures from areas 36 and 38 produce a lesser pressure on diaphragm 34 than is produced by the combined pressures of the gas pressure in pressure chamber 30 and the spring pressure of spring 32.

Figure 7:
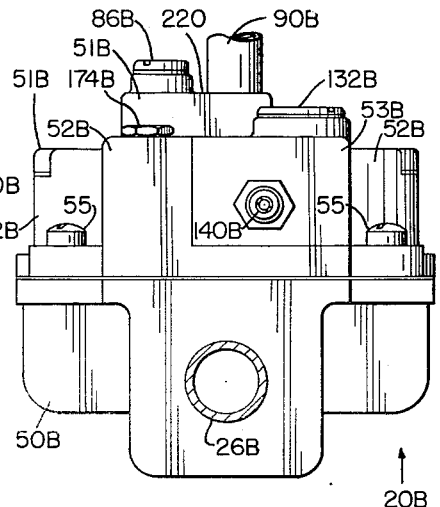
FIGURE 7 is a discharge end view of FIGURE 6.
Figure 8:
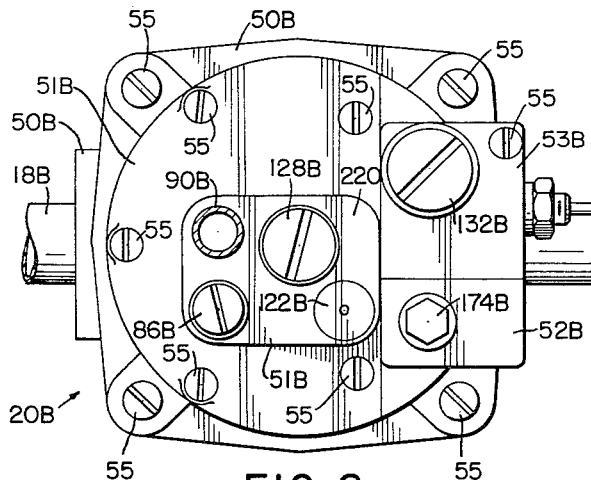
FIGURE 8 is a top view of FIGURE 6.

The diaphragm 28 may include a resilient valve face 42 secured by a rivet assembly 44. The spring 32 may have its lower end resting in a circular metal pan 46, also held by the rivet assembly 44 on the main flexible and hermetic web 48 of the diaphragm. The periphery of the web 48 is sealed and held between the valve body cast sections 50 and 52. The main valve construction 20 may also include the casing castings 51 and 53. The castings 50–53 may be joined with suitable gaskets and suitable screw bolts and the like 55, such as are shown in FIGURES 6, 7 and 8.

A pilot means 54 is provided to ignite the burner 10.

Said means 54 has a standby pilot 56 to produce a standby pilot condition or flame 58 which remains ignited until accidentally or purposely extinguished. This flame 58 may ignite the main burner 10 when gas is fed in sufficient quantity to the main burner. The pilot means 54 also has an intermittent pilot 60 which produces an intermittent pilot condition or flame 62.

Standby pilot gas feed means may be provided. Such means may include a standby flow path including pipe sections 64, 66, 68, filter and pilot adjusting valve 70 and safety standby passageways 72 in the safety valve construction 74, with the pipe section 68 being connected to the standby pilot 56, and the pipe section 64 being connected to the main gas valve 19 ahead of the valve so pilot gas can flow into pipe 66 whether the gas valve 19 is open or not. The filter and pilot adjusting valve 70 may be closed completely if it is desired to turn off the standby pilot for any reason.

Intermittent gas feed means or an intermittent feed gas flow path may be connected to the gas supply means and may pass through said thermostatic valve means or gas throttling valves 14, 16 and may then feed gas to the intermittent pilot 60. For this purpose, a path or passageway 76 may be connected to the gas supply means 18 by being connected to the inlet pressure area 36. Intermittent gas and bleed gas (to be described) are discharged from the passageway 76 into the filter 78 and intermittent gas is then discharged into the passageway 80, past the volume regulator 82, which is adjusted by screw 84 by removing screw cap 86. The intermittent gas then flows through passage 88, pipe 90, through thermostatic valves 14 and 16, pipe 92, intermittent safety passages 96 in safety valve 74, pipe 98, to feed intermittent pilot 60, to produce the intermittent pilot condition with intermittent pilot flame 62.

The intermittent pilot condition or flame 62 controls the operation of the burner 10 in response to temperature conditions in the space or water heater 12 which is being heated by the burner. To this end, the intermittent flame 62 intermittently heats the intermittent pilot thermostatic element or mercury bulb 100 in response to temperature conditions in the water heater 12, and the bulb 100 in turn controls a thermostatic bleed control valve 102 in regulator 20. The bleed control valve indirectly controls the opening and closing of the main diaphragm valve 28 which controls the feed of gas to the burner 10.

A gas flow bleed path is established to enable the bleed control valve 102 indirectly to control the main diaphragm valve 28. This bleed path is connected to the gas supply means 18 through inlet pressure area 36, passageway 76, filter 78, passageway 104, restricting orifice 106, pressure chamber 30, pressure responsive trigger valve 108, trigger pressure chamber 110, passage 112, bleed control valve 102, chamber 135, passage 114, and discharge outlet 24. This bleed path regulates the gas pressure in pressure chamber 30 and so regulates the opening and closing of diaphragm valve 28 in response to the opening of bleed control valve 102. The throttling by restricting orifice 106 and the opening of bleed control valve 102 have a regulating effect on the gas pressure in chamber 30 and hence also on the opening and closing of the diaphragm valve 28 and burner 10.

The pressure responsive trigger valve 108 has a variable restrictive effect on the flow of the bleed gas by the upward and downward movement of the valve plunger 116 which is actuated by the diaphragm 118 in response to the difference in pressure between the trigger pressure chamber 110 and the atmospheric pressure chamber 120 which is vented at 122 to the atmosphere. The spring 124 modifies the action of the diaphragm 118, and the spring 124 may be adjusted by screw disc 126 which may be adjusted by removing screw cap 128.

The bleed control valve 102 has a valve disc 128 which is downwardly pressed by spring 130 which is held down by screw cap 132. The valve 102, 128 is pushed upwardly by lever 134 which is fulcrumed at 136. The lever 136 is actuated by the diastat or expansible chamber 138 in response to the heating of mercury bulb 100 and transfer of pressure through pipe 140.

The valve 102 opens and closes to cause main diaphragm valve 28 to open and close in response to the change in bleed gas pressure in chamber 30 to turn burner 10 on and off. However, pressure responsive trigger valve 108 causes main diaphragm valve 28 to act as a pressure regulator for gas outlet 24 to maintain a desired gas pressure in outlet 24 to produce proper flame action in burner 10.

Trigger valve 108 tends to open main valve 28 more when the gas pressure in outlet 24 tends to fall too low and vice versa. When the gas pressure in outlet 24 is too high, this high gas pressure "backs up" into trigger pressure chamber 110 through passages 114 and 112 and causes diaphragm 118 to move plunger 116 upwardly. This in turn tends to increase the gas pressure in chamber 30 because of the greater restriction produced in valve 108. The greater pressure in chamber 30 causes main diaphragm valve 28 to move downwardly to restrict the passage of gas past valve seal 40. This in turn tends to reduce the overpressure in outlet 24. A gas under-pressure condition in outlet 24 causes the trigger pressure chamber 110 to be reduced in pressure and thus to move plunger 116 downwardly. This reduces the restriction at valve 108 and so reduces the pressure in chamber 30. This permits the main valve 28 to move higher to permit more gas to flow past valve seat 42 and thus to increase the pressure of the under-pressure gas in outlet 24.

The safety pilot control valve 74 may be of any well known construction. It is merely shown diagrammatically in FIGURE 3. For example, it may have a push button 142 which is pushed down when it is desired to ignite standby pilot 56. When button 142 is pushed down, plunger 144 pushes valve 146 down to close passageway 96 and thus prevent the feeding of gas to intermittent pilot 60 and, indirectly, to the burner 10. At the same time, the finger 149 of plunger 144 rocks the lever 148 about the fulcrum 150 to raise the pin 151 and plunger upwardly. The plunger 152, raises the movable valves 154 and 155 from closed dotted line positions to the full line positions. The plunger 152 may have a flexible seal at 153'. The valves 154 and 155 are downwardly biased by weak springs 156 and 157. Valve 154 also has a continuation 158 of plunger 152 and magnetic armature 160 rigidly secured thereto. When valves 154 and 155 are raised by the downward push on button 142, the continuation 158 and magnetic armature 160 are raised from the dotted line position to the full line position of armature 160. An electromagnet 162 is electrically connected by wires 163 to the thermoresponsive element or bimetal thermocouple or element 164. When the valves 154 and 155 are opened by downward push of button 142, the operator ignites the standby pilot 56 and holds the button 142 for 30 seconds or more, until the thermocouple 164 has been heated sufficiently to generate the required current in wires 163 and electromagnet 162 to hold the armature 160 and valves 154 and 155 in the upper full line position. When the button 142 is thereafter released, it is moved to upper full line position by the action of compression spring 165, but the valves 154 and 155 and armature 160 remain in upper, open positions, since the current in electromagnet 162 remains sufficient to hold the valves 154 and 155 in upper open positions until the standby pilot is extinguished either accidentally or deliberately. If the standby pilot is thereafter extinguished, the thermocouple will cool quickly to reduce the electric current and to release the armature 160 and valves 154 and 155 for movement to the closed dotted line positions, to stop flow of gas to the standby and intermittent pilots 56 and 60.

Figure 5:
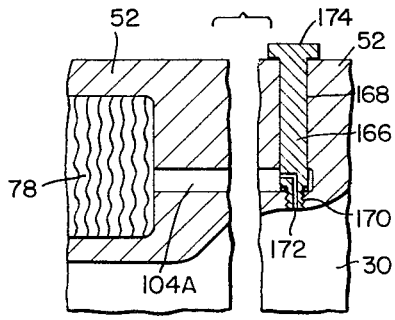
FIGURE 5 is a diagrammatic representation of a bleed line removable orifice forming member which may be used in the main valve.

The restricting orifice 106 and passageway 104 of FIGURE 3 may be replaced by a construction such as shown in FIGURE 5, to permit the orifice to be removable and replaceable where desired. To this end, the passage 104A of FIGURE 5 may be changed to pass from filter 78 through casting 52 to any convenient place where a removable orifice screw construction 166 may be insertable through an opening 168 in casting 52 (or any other part of the casing of main valve 20) so the same is in threaded and substantially sealed engagement at compressible gasket 169 with the casting 52 above smaller diameter screw portion 170. The construction 166 may have a suitable orifice passageway 172 which is connected to passageway 104A and to pressure chamber 30. A screw head 174 may be provided which can be turned to sealed engagement with the surface of casting 52, with an interposed gasket, if desired. By this construction, orifices of various capacities may be used to meet varying requirements of individual installations.

Figure 4:
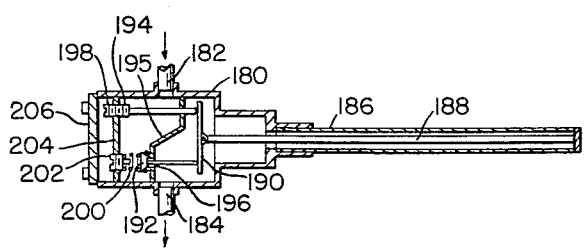
FIGURE 4 is a diagrammatic representation of the one or more thermostatic valves which may be used in the space being heated.

FIGURE 4 shows, diagrammatically, one type of theromostatic valve which may be used in the space to be heated, such as space 12. Either or both of the valves 14 and 16 may have a valve casing 180 to which the gas feed line 90, 92 may be connected at inlet 182 and outlet 184. A tube 186 and rod 188 are connected respectively to casing 180 and a lever 190. The materials of the tube and rod are such that the tube has a greater coefficient of thermal expansion than the rod 188.

The lever 190 may be mounted in any desired manner so it tends to close valve 192 when the temperature of the medium surrounding the tube 186 rises, and vice versa. To this end, the lever 190 may be fulcrumed on an adjustable screw at one end, may contact or be attached to valve 192 at the other end and may contact or be attached to the rod 188 intermediate such ends.

The screw may pass through a gas separating wall 195 which separates the inlet 182 from the outlet 184 except for the valve opening 196. The screw 194 may pass through and be threadedly engaged to wall 204 and may have an adjusting head 198.

The valve 192 may be spring biased rightward by spring 200. The left end of spring 200 may be adjustably held at 202 by an adjustable screw construction with its adjusting head exposed on the left side of wall 204. The screw 194 and screw head 198 also may extend to the left of wall 204. A removable, hermetic cover 206 may be provided for adjustment, repair, etc.

Any other suitable thermostatic valve construction may be used in lieu of the valve of FIGURE 4.

The maximum temperature settings of valve construction 16 may be 180° F. and for valve construction 14 may be 195° F. At these temperature settings the valves 192, FIGURE 4, of the constructions 14 and 16 close, so that effective heating of the mercury bulb 100 will cease at these settings and the bleed line valve 102 will close, thus causing the pressure to increase in pressure chamber 30 and close main diaphragm valve 28 and to stop flow of gas to the burner 10. When the temperatures in the space or water heater 12 fall below the maximum settings, the valve constructions 14 and 16 will open to feed gas to the intermittent pilot 60. The pilot 60 is ignited by standby pilot 56 and heats the mercury bulb 100. The mercury vapor pressure causes bleed line valve 102 to open, which in turn reduces the pressure in pressure chamber 30 sufficiently to allow the inlet pressure in space 36 to open the diaphragm valve 28. This feeds burner gas to burner 10 again to heat the space 12.

The water heater of FIGURE 1 may include the usual water inlet pipe 207, hot water outlet 208, vent 209, and any other constructions which are normally used in water heaters of that type.

FIGURE 2 show a system in which a booster water heater 210 is connected to feed heated water into a hot water, large volume storage tank 214 by convection, by pumping action, and the like, such as by convection pipes 216 and 218.

The heater 210 and the storage tank 214 constitute the space to be heated by the burner.

The components previously described in connection with FIGURES 1, 3, 4 and 5 may be used to heat the tanks or spaces 210 and 214 of FIGURE 2. The components previously described are indicated in FIGURE 2 with the same reference numerals which were previously used. For convenience, the letter "A" is used after such reference numerals. The general operation of the components is substantially identical except where specifically indicated herein to be different. Where the operation is substantially the same in these components and the pipe connections, electrical connections, etc., description thereof is not repeated.

The safety valve construction 74 of FIGURES 1, 3, etc., may be used in the system of FIGURE 2, if desired. It has been omitted in the illustration in FIGURE 2 to show the connections when it is desired not to use such valve 74. The pilot construction 54A may be provided with standby pilot 56A, intermittent pilot 60A, mercury bulb 100A, but the thermocouple 164 of FIGURE 3 has been omitted. In FIGURE 2, gas line 92A may be connected directly to intermittent pilot 60A and pipe 66 may be connected directly to standby pilot 56A, since safety valve 74 has been omitted.

If the standby pilot 56A should be extinguished accidentally, so intermittent pilot 60A cannot be reignited when the intermittent gas line 92A is cycled, the main diaphragm valve 28, FIGURE 3, remains closed, and does not supply gas to burner 10A, because the mercury bulb 100A cannot be heated to open bleed valve 102, FIGURE 3. The main burner 10A therefore automatically cut off, but the pilots 56A and 60A are not automatically shut off. Therefore, the pilot system shown in FIGURE 2 is not the 100% safety shut off system of the kind shown in FIGURE 3. If the amount of unignited pilot gas discharged by pilots 56A and 60A is not too great, and ventilation is sufficient, no explosion is likely to be caused in the FIGURE 2 pilot system.

The bleed valve 102, FIGURE 3, may be opened and closed by other types of actuators. Bulb and bellows and clicker mechanisms, bimetal rod and tube and clicker mechanisms, and bimetallic electrical switch and solenoid mechanisms may be used in lieu of the mercury bulb 100 and diaphragm capsule 138 illustrated in FIGURE 3.

The schematic showing of valve construction 20 in FIGURE 3 is a single plane illustration in which many of the elements of valve construction 20 are in continuous longitudinal displacement. However, many of these elements may actually be spaced in directions transverse to the plane of FIGURE 3. Such a transverse displacement is illustrated in FIGURES 6, 7 and 8. Reference characters similar to those used in FIGURE 3 are used in FIGURES 6, 7 and 8. However, the letter "B" is added to these reference characters of FIGURES 6, 7 and 8 to denote that the method of illustration has been changed, but that the function and general relationship of the parts so designated remains the same. It is also understood that the internal parts of the valve construction of FIGURES 6, 7 and 8 is modified to cooperate with the external parts illustrated in FIGURES 6, 7 and 8.

It is deemed unnecessary to describe the functions and mode of operation of the various elements designated by the suffix B, with the possible exception of vent 122B which is shown as a countersunk disc with a central orifice located adjacent the top flat surface 220 of section 51B. If desired, proper filtering material may be provided under the disc 122B.

If desired, valve constructions 14, 16 (and 14A and 16A) may be such that partial closing of one or both of their valves 192, FIGURE 4, may throttle the flow of gas through the pilot line 92 (or 92A) enough to reduce the size of pilot flame 62 to the size that it cannot heat bulb 100 (or 100A) enough to open valve 102, 128 sufficiently to open main valve 28, and vice versa. This type of operation causes the main burner valve 28 to open and close in response to the temperatures of space 12, FIGURE 1, or spaces 210 and 214 in FIGURE 2.

On the other hand, the valve constructions 14 and 16, or 14A and 16A, may have snap acting valves (well known per se) instead of the throttling valves 192 of FIGURE 4. In such case the intermittent pilot 60 or 60A is completely turned off if either or both valve constructions 14 and 16 (or either or both constructions 14A and 16A) are snapped shut. The intermittent pilots 60 or 60A are not turned on until both the valve constructions 14 and 16 (or both 14A and 16A) are snapped open.

A method of controlling the heating of a space has been provided in which the space 12 (or 210, 214) is heated by the operation of gas burner 10 (or 10A). A thermostatic gas flow controlling thermostatic valve means 14 and/or 16 (or 14A and/or 14A) opens and closes in response to fall and rise in temperatures in the space 12 (or 210, 214). Gas is supplied from a gas supply means 18 (or 18A) to a regulator construction 20 (or 20A) with its intake connected to said gas supply means 18 (or 18A) and with its discharge 24 connected to said burner 10 (or 10A), and controlling the main supply of gas from said gas supply means 18 (or 18A) to said burner 10 (or 10A) by a main valve 28, 42 in said regulator construction 20 (or 20A), and controlling the opening and closing of said main valve 28, 42 by the gas pressure in a pressure chamber 30. Said burner 10 (or 10A) is ignited by pilot means 56, 60 which has a standby pilot condition 58 and an intermittent pilot condition 62. Standby pilot gas is fed to said pilot means through a standby flow path 64, 70, 74 and 68 connected to said gas supply means 18 to provide said standby pilot condition 58. Intermittent pilot gas is supplied to said pilot means through an intermittent feed gas flow path 76, 78, 80, 88, 90, 14, 16, 92, 74 and 98 connected to said gas supply means 18, passes through said thermostatic valve means 14 and 16 (or 14A and 16A) and feeding said pilot means to provide said intermittent pilot condition 62. The operation of main valve 28, 42 is controlled by a bleed gas flow through a bleed path which is connected to said gas supply means, passing through the control chamber 30, through the thermostatic bleed control valve 102, 128 and connected to the discharge 24 and to the burner 10 (or 10A). The valve 102, 128 is controlled by the intermittent pilot thermostatic element 100 (100A) which is responsive to the intermittent pilot condition 62.

The method also includes the control of main valve 28, 42 to produce a regulating effect on the gas pressure at outlet 24 by reaction with trigger valve 108, 116 which controls or modifies the bleed gas pressure in bleed flow path, including chamber 30.

The method also may include the control of the flow of the pilot gas by the automatic pilot safety valve 74 which produces safety conditions during manual ignition by the pushing of manual control 142 to open the standby pilot gas path and to close the intermittent pilot gas path during manual ignition, and to lock the standby path and the intermittent path open when the manual control 142 is released after completion of the manual ignition procedure.

The operation of the system of FIGURES 1 and 3 is as follows:

Upon a demand for heat by the temperature of the water in the tank 12 at the level of the thermostatic valves 16 and 14 below their respective settings the valves 192 are open to allow intermittent pilot gas to flow from the filter cavity 78 through adjustment 84 and connection 90 through the valves to the intermittent pilot 60 which heats the bulb 100 of the mercury expansible chamber or expansible wafer assembly 138. The vaporization of the mercury in the expansible wafer assembly acts through lever 134 in the control to open bleed gas valve 102, 128. Bleed line gas has passed through filter 78 through a channel 104 and orifice 106 to the cavity 30 above diaphragm assembly 48 through the regulator valve opening 108 through cavity 110 and channel 112 to the bleed gas valve 102, 128. As bleed gas valve 102, 128 opens, the gas continues through cavity 135 and channel 114 to the burner control outlet 24. As the gas passes first through the restricting orifice 106 in channel 104, the pressure in chamber 30 above the diaphragm assembly 28 is reduced sufficiently to allow the inlet pressure in chamber 36 below the diaphragm assembly 48 to open the diaphragm valve 28, 42, allowing gas to flow through the control to the control outlet 24 and pipe 26 and to the burner 10. Subsequent heating of the water satisfying either of the thermostats 16 or 14 causes sufficient throttling in the intermittent pilot line (or complete stoppage in the case of alernative snap acting valves) to reduce or extinguish the intermittent pilot flame sufficiently or completely to lower the temperature of the bulb of the mercury expansible chamber diastat assembly 138 below the vaporization temperature of the mercury therein. The resultant rapid contraction of the expansible chamber or mercury diastat 138 allows the spring 130 to close the bleed valve 102, 128. The closure of the bleed valve 102, 128 acts to impose an equalized pressure on both sides of the diaphragm assembly 48 with diaphragm valve spring 32 acting to close the diaphragm valve 28, 42. Complete closure of both the main diaphragm valve 28, 42 and the bleed gas valve 102, 128 during the off cycle insures no bleed gas being fed to the burner 10 during the off cycle as can occur in a system where a throttling valve instead of quick acting completely open or closed valve 102, 128 is directly in the bleed line.

Subsequent draws of water tending to reduce the water temperature by as little as 3° F. acts to open the control thermostatic valve 16 or 14 sufficiently to increase the flow of gas to the intermittent pilot to the point where the bulb 100 of the mercury expansible wafer assembly 138 is heated sufficiently to reach the vaporization temperature of the mercury therein. (In the case of snap acting valves in 16 or 14 both 16 and 14 must open before the intermittent pilot 60 is ignited.) This expansion causes the expansible wafer 138 to move so as to open the diaphragm valve 28, 42 in control 20 in the same manner as previously described.

The system shown in FIGURE 2 operates substantially the same as has just been described for FIGURES 1 and 3, except that some of the members referred to in such description are indicated in FIGURE 2 with the suffix "A" added to their reference numerals, and hence such suffix "A" should be mentally applied, where applicable, in reading the description in connection with FIGURE 2. It is also understood that where reference is made to tank or space 12 in connection with FIGURE 1, the description applies to spaces or tanks 210 and 214 combined, as is obvious.

In addition to the functioning of control 20 as a diaphragm valve, the control performs the additional function of acting as a main gas pressure regulator. Outlet pressure of the control 20 in the chamber leading to outlet 24 is sensed through channels and chambers 114, 135, 112, 110 when the bleed gas valve 102, 128 and the diaphragm valve 28, 42 are open during the "On" cycle, with valve 28, 42 open. The sensed outlet pressure acts on the regulator diaphragm 118 of small pilot regulator 116. An increase in outlet pressure at 24 likewise increases pressure in chamber 110 and acts to cause partial closing of the regulator valve opening 108 of the small pilot regulator 116. This action in turn increases the pressure in chamber 30 above the diaphragm valve assembly 48 acting to partially close the diaphragm valve 28, 42 and thus providing a throttling regulator action by the valve 28, 42 tending to maintain the pressure at the outlet 24 substantially constant. Upon a drop in the outlet pressure at 24 and the resultant opening of the regulator valve 108 of the small pilot regulator 116 causes a corresponding decrease in pressure in chamber 30 above the diaphragm assembly 48 due to the restriction in channel 106. This drop in pressure above the diaphragm assembly 48 results in a corresponding increase in the opening of the diaphragm valve 28, 42 as the inlet pressure at 36 forces the valve 28, 42 further open. This increase in diaphragm valve opening tends to compensate for the initial drop in outlet pressure at 24 to bring the outlet pressure back to a value approaching the original setting.

Changing the force on the small regulator spring 124 through adjustment of regulator adjustment 126 acts to increase or decrease the regulated pressure through the small pilot regulator 116 and results in a corresponding increase or decrease in the regulated outlet pressure at 24 through the diaphragm valve 28, 42.

In case of pilot outage a complete 100% shut off of gas occurs with the automatic pilot 74 in the system. Pilot outage causes cooling of both the bulb 100 of expansible wafer assembly 138 and the thermocouple 164 which controls electromagnet 162 of automatic pilot control 74. The cooling of the expansible wafer bulb 100 results in main diaphragm valve closure at 28, 42 in control 20 and the cooling of the thermocouple 164 of automatic pilot control 74 causes demagnetization of the magnet 162 and closing of the magnetic safety valve at 154 in control 74 thereby securing closure of both the standby and intermittent pilot lines 68 and 98 and providing 100% shut off.

Intermittent pilot throttling by throttling type thermostatic valves 16 and 14 can cause complete intermittent pilot outage. Upon a demand for heat and an increase in intermittent pilot flow, the intermittent pilot 60 is ignited by the standby pilot. The standby pilot also serves for ignition of main burner gas.

The bleed line 18, 36, 76, 78, 104, 106, 30, 108, 110, 112, 102, 135, 114, 24, for operation of the diaphragm valve 28 is entirely within the confines of the control body 20 and is controlled by the bleed line valve 102 also within the control body. This construction minimizes the possibility of leakage in the bleed line system acting to inadvertently open the diaphragm valve 28. In the conventional system, leakage in the tubing, external connections of tubing to main control body and to the thermostat can cause the main valve to open regardless of thermostat condition. This can cause an extremely hazardous condition particularly on a water heater application where a continuously open main burner valve can cause a continuous temperature build up and a resultant explosion. In the conventional system such connections are dependent on installation procedures and care. In the control and system of this invention, the bleed line is confined to the main control body 20 and allows control of bleed line porting and elimination of leakage in the construction of the basic control without depending on installation procedures.

In addition, as the bleed line is confined to the main control body 20, the possibility of leaks being caused in impact and contact with the external tubing after installation is eliminated.

In prior systems where both diaphragm valve action and regulation control are incorporated, a sensing line to the outlet or burner feed of the main valve through the thermostat is necessary to secure pressure regulation. This makes mandatory a snap acting thermostatic valve to secure complete shutoff so that bleed line gas will not be fed to the outlet and burner under off conditions. The use of a throttling type thermostatic valve such as illustrated in FIGURE 4 instead of a snap acting thermostat valve provides closer temperature control as response is essentially linear without the required temperature differential required for snap action. In using a throttling type valve directly in the bleed line of prior systems to replace a snap acting valve, the throttling valve can throttle sufficiently to close the main burner valve while still passing gas to the outlet through the bleed line. This can cause burning at the orifice or flash back. A similar condition can be encountered on opening when the throttling valve opens to a degree to pass bleed gas but in an amount insufficient to open the main diaphragm valve.

However, the system of this invention utilizes the throttling type thermostatic valve 14 and 16 with its inherently low operating temperature differential and at the same time eliminates the objection of bleed gas being passed to the outlet under main diaphragm valve "Off" conditions. This is done by having the throttling thermostatic valve of FIGURE 4 control the gas to an intermittent pilot 60 which controls the action of a mercury diastat actuator 138 to operate the bleed line valve 102 directly in the control body. By introducing this suplementary actuator system an essentially snap acting bleed valve control is obtained under the control of a sensitive low temperature differential throttling valve of FIGURE 4 thereby securing the advantage of low temperature differential control with a positive shut off bleed line gas valve. As the temperature differential of the throttling thermostatic valve of FIGURE 4 acts to control the gas to the intermittent pilot 60, the required temperature differential control with a positive shut off bleed line gas the throttling valve of FIGURE 4 at 14 or 16 as the pilot flame changes size. As the two requirements are met simultaneously the effective temperature differential is that of the throttling thermostatic valves as required to operate the diaphragm valve. As the sensing bleed line in the control is controlled by the mercury diastat operated valve 102 between "On" and "Off" positions, no bleed line gas flows to the outlet 24 under main diaphragm valve off conditions. The throttling by-pass gas through the throttling thermostatic valve 14 or 16 is burned by the intermittent pilot and as this gas is not routed to the control outlet 24 to the burner no adverse flash back of main burner orifice burning is encountered.

A new and useful apparatus for controlling space heating has been provided.

While the form of the invention now preferred has been disclosed as required by the statutes, other forms may be used, all coming within the scope of the claims which follow.

What is claimed is:

1. In combination: a main gas burner for heating a space; a gas flow controlling thermostatic valve means opening and closing in response respectively to fall and rise in temperatures in said space; a gas supply means; a regulator casing with a casing intake connected to said gas supply means and a casing discharge connected to said burner, said casing having a main valve controlling the main flow of gas from said gas supply means to said burner, and having a pressure chamber controlling the opening and closing of said main valve; a standby pilot to ignite said main gas burner; an intermittent pilot to be ignited by said standby pilot; standby pilot gas feed means forming a standby gas flow path connected to said gas supply means and feeding gas to said standby pilot; intermittent gas feed means forming an intermittent feed gas flow path and including an intermittent passageway means in said casing connected to said casing intake and passing through said casing to a discharge opening in said casing connected to pipe connections passing through said thermostatic valve means and feeding gas to said intermittent pilot; a thermostatic bleed control valve in said casing; main valve control bleed gas flow means in said casing forming a gas flow bleed path connected to said casing intake, passing through a restricting orifice into said pressure chamber, passing through said thermostatic bleed control valve in said casing and through a passageway in said casing extending from said bleed control valve and connected to said casing discharge to said main burner; and an intermittent pilot thermostatic element responsive to the heating effect of said intermittent pilot and effectively unresponsive to the heating effect of said standby pilot and having an impulse connection to said thermostatic bleed control valve.

2. A combination according to claim 1 in which a pressure responsive trigger valve in said casing is responsive to pressure in said bleed gas flow means and which with said thermostatic bleed control valve and said intermittent thermostatic element control the gas flow pressure in said pressure chamber to control a pressure regulating action of said main valve in response to intermittent pilot conditions.

3. In combination: a main gas burner for heating a space; a gas flow controlling thermostatic valve means opening and closing in response respectively to fall and rise in temperatures in said space; a gas supply means; a regulator casing with a casing intake connected to said gas supply means and a casing discharge connected to said burner, said casing having a main valve controlling the main flow of gas from said gas supply means to said burner, and having a pressure chamber controlling the opening and closing of said main valve; a standby pilot to ignite said main gas burner; an intermittent pilot to be ignited by said standby pilot; standby pilot gas feed means forming a standby gas flow path connected to said gas supply means and feeding gas to said standby pilot; intermittent gas feed means forming an intermittent feed gas flow path and including an intermittent passageway means in said casing connected to said casing intake and passing through said casing to a discharge opening in said casing connected to pipe connections passing through said thermostatic valve means and feeding gas to said intermittent pilot; a thermostatic bleed control valve in said casing; main valve control bleed gas flow means in said casing forming a gas flow bleed path connected to said casing intake, passing through a restricting orifice into said pressure chamber, passing through said thermostatic bleed control valve and connected to said casing discharge to said main burner; and an intermittent pilot thermostatic element responsive to the heating effect of said intermittent pilot and effectively unresponsive to the heating effect of said standby pilot and having an impulse connection to said thermostatic bleed control valve; said combination having an automatic pilot valve igniting control construction having manual means operable to igniting position to close said intermittent feed gas flow path and to open said standby flow path; means operable when said standby pilot is ignited and when a separate standby thermostatic element is heated by said standby pilot to lock said standby flow path in open condition until said standby pilot is extinguished and means manually operable thereafter when said manual means is released to open said intermittent flow path for control of said thermostatic bleed control valve in response to intermittent pilot conditions.

4. A combination according to claim 1 in which an adjustable valve is provided in said casing to adjust the rate of gas flow to regulate the flame in said intermittent pilot independently of the rate of gas flow to said standby pilot.

5. A combined diaphragm valve and pressure regulator construction comprising: a casing having a casing gas intake in said casing to be connected with a source of gas and having a casing gas discharge to be connected to a main gas burner to heat a space; a diaphragm main valve in said casing controlling the main flow of gas from said gas intake to said gas discharge; means in said casing forming a pressure chamber in said casing the gas pressure of which controls the opening and closing of said main valve, said diaphragm main valve having one side subject to pressure in said pressure chamber and the other side being subject to the pressures in said intake and discharge; a standby pilot to ignite said main gas burner and having a gas feed connection with said source of gas; feed means in said casing forming an intermittent feed gas flow passageway connected to said casing gas intake and having an outlet connection in said casing to be connected to a thermostatic valve responsive to temperature conditions in said space and to an intermittent pilot to be ignited by said standby pilot; a thermostatic bleed control valve in said casing to be connected to an intermittent pilot control element responsive to the heating effect of said intermittent pilot and effectively unresponsive to the heating effect of said standby pilots; and a main valve control bleed gas flow means in said casing forming a gas flow bleed bath connected to said casing gas intake, passing through through a restricting orifice in said casing, passing into said pressure chamber, passing through said thermostatic bleed control valve in said casing and through a passageway in said casing extending from said bleed control valve and connected to said casing discharge to control the opening and closing of said main valve in response to temperature conditions in said space.

6. A construction according to claim 5 in which a pressure responsive trigger valve in said casing is responsive to pressure in said bleed gas flow means and which with said thermostatic bleed control valve and said intermittent thermostatic element control the gas flow pressure in said pressure chamber to control a pressure regulating action of said main valve in response to intermittent pilot conditions.

7. A construction according to claim 5 in which an adjustable valve is provided in said casing to adjust the rate of gas flow to regulate the flame of said intermittent pilot independently of the rate of gas flow to said standby pilot.

References Cited in the file of this patent

UNITED STATES PATENTS

| | | |
|---|---|---|
| 1,457,127 | Schuck et al. | May 29, 1923 |
| 1,756,688 | Hutchinson | Apr. 29, 1930 |
| 1,805,971 | Bristol | May 19, 1931 |
| 1,824,057 | Robertshaw et al. | Sept. 22, 1931 |
| 1,842,335 | Te Pas | Jan. 19, 1932 |
| 1,853,194 | Bogle | Apr. 12, 1932 |
| 2,002,409 | Meacham | May 21, 1935 |
| 2,265,210 | Waddell | Dec. 9, 1941 |
| 2,319,676 | Guelson | May 18, 1943 |
| 2,372,564 | Engholdt | Mar. 27, 1945 |
| 2,505,432 | Sagar | Apr. 25, 1950 |
| 2,553,575 | Grayson | May 22, 1951 |
| 2,707,519 | Strobel | May 3, 1955 |
| 2,743,871 | Heiser et al. | May 1, 1956 |
| 2,933,257 | Clark | Apr. 19, 1960 |
| 3,092,323 | Wantz | June 4, 1963 |